US009346985B2

(12) United States Patent
Li et al.

(10) Patent No.: US 9,346,985 B2
(45) Date of Patent: May 24, 2016

(54) METHODS FOR PREPARATION OF POLYESTER/GLYOXALATED POLYVINYL ALCOHOL SEMI-INTERPENETRATING POLYMER NETWORK HOT-MELT ADHESIVE

(71) Applicants: Kunshan TianYang Hot Melt Adhesive Co., Ltd., Jiangsu (CN); Shanghai TianYang Hot Melt Adhesive Co., Ltd., Shanghai (CN); East China University of Science and Technology, Shanghai (CN)

(72) Inventors: Zhelong Li, Shanghai (CN); Wanyu Zhu, Shanghai (CN); Fangqun Wu, Shanghai (CN); Zuoxiang Zeng, Shanghai (CN)

(73) Assignees: KUNSHAN TIANYANG HOT MELT ADHESIVE CO., LTD, Jiangsu (CN); SHANGHAI TIANYANG HOT MELT ADHESIVE CO., LTD, Shanghai (CN); EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 94 days.

(21) Appl. No.: 14/355,525

(22) PCT Filed: Jun. 20, 2013

(86) PCT No.: PCT/CN2013/077547
§ 371 (c)(1),
(2) Date: Apr. 30, 2014

(87) PCT Pub. No.: WO2013/189294
PCT Pub. Date: Dec. 27, 2013

(65) Prior Publication Data
US 2014/0303323 A1 Oct. 9, 2014

(30) Foreign Application Priority Data

Dec. 28, 2012 (CN) .......................... 2012 1 0581743

(51) Int. Cl.
| | |
|---|---|
| *C09J 167/00* | (2006.01) |
| *C08L 29/04* | (2006.01) |
| *C09J 129/14* | (2006.01) |
| *C09J 167/02* | (2006.01) |
| *C08J 3/24* | (2006.01) |

(52) U.S. Cl.
CPC ................ *C09J 167/00* (2013.01); *C08J 3/246* (2013.01); *C09J 129/14* (2013.01); *C09J 167/02* (2013.01); *C08J 2329/14* (2013.01); *C08J 2367/02* (2013.01)

(58) Field of Classification Search
CPC ...... C09J 129/14; C09J 167/02; C09J 167/00; C08J 3/246; C08L 67/02; C08L 29/14
USPC ..................................................... 525/558, 58
See application file for complete search history.

(56) References Cited

U.S. PATENT DOCUMENTS 5,904,974 A * 5/1999 Hanada ................ B41M 5/5254
428/207
6,255,443 B1 7/2001 Kinkelin et al.

FOREIGN PATENT DOCUMENTS

| CN | 1340585 | 3/2002 |
|---|---|---|
| CN | 200710043238.2 | 2/2008 |
| CN | 101955746 A | 1/2011 |
| CN | 102492248 A | 6/2012 |
| CN | 102675609 A | 9/2012 |
| CN | 103013415 A | 4/2013 |

* cited by examiner

*Primary Examiner* — Alexa Neckel
*Assistant Examiner* — Marie Reddick
(74) *Attorney, Agent, or Firm* — Muncy, Geissler, Olds & Lowe, P.C.

(57) ABSTRACT

A polyester/glyoxalated polyvinyl alcohol semi-interpenetrating polymer network hot-melt adhesive and preparation method therefore, mainly includes the steps of: 1) transesterification of certain amounts of dimethyl terephthalate and another dibasic ester with 1,4-butanediol and other diols in the presence of an organotin catalyst under a nitrogen atmosphere in a reactor, completed upon the amount of distillation of a monohydric alcohol byproduct reaching greater than 95% of the theoretical amount; 2) after the temperature is maintained for a period of time, adding in a stabilizer and a polycondensation catalyst and incrementally increasing the temperature to trigger a polycondensation reaction under a reduced pressure to produce particles of a copolymer, and freezing and pulverizing the copolymer particles to produce a powder of a copolyester; 3) uniformly blending a polyvinyl alcohol/glyoxal mixture with the powder produced in step 2) at ambient temperature to produce the target product. The product is capable of forming an internal semi-interpenetrating network at application temperatures.

3 Claims, No Drawings

METHODS FOR PREPARATION OF POLYESTER/GLYOXALATED POLYVINYL ALCOHOL SEMI-INTERPENETRATING POLYMER NETWORK HOT-MELT ADHESIVE

TECHNICAL FIELD

The present invention relates to the preparation of a polyester/glyoxalated polyvinyl alcohol semi-interpenetrating polymer network hot-melt adhesive by the addition of polyvinyl alcohol (PVA)/glyoxal.

BACKGROUND

Currently known polyester based hot-melt adhesives are all prepared by further subjecting the products of transesterification of dibasic esters with diols, or the products of esterification of dibasic acids with diols, to a low-pressure polycondensation. For example, U.S. Pat. No. 6,255,443 discloses a method for preparation of low-melting copolyester hot-melt adhesives. Chinese Publication No. CN 1340585 provides a process for preparing a high-melting copolyester hot-melt adhesive. Moreover, Chinese Application No. 200710043238.2 describes an improved copolyester hot-melt adhesive obtained by modifying the copolyester with a metal salt of sorbic acid and an ethylene/acrylic acid copolymer.

Although, in the preparation of all these copolyester hot-melt adhesives, non-linear molecular materials, such as isophthalic acid, are added to impede them from having a linear molecular structure, so as to satisfy certain demands of garment and other industries, due to their slow crystallizing and solidifying properties, when used in the processing of interlinings, they will cause a so-called "stick-back" problem. Therefore, the conventional hot-melt adhesives are neither suitable for production-line applications where fast adhesion is required, nor can be used to produce films or double-sided adhesive nets.

In contrast, the present invention provides a method for the preparation of a polyester/glyoxalated polyvinyl alcohol semi-interpenetrating polymer network hot-melt adhesive, which has incomparable advantages in performance over those produced by other polymerization techniques. This hot-melt adhesive is characterized in maintaining a potential reactivity under normal production conditions, while having the capability of forming, at a relatively low temperature, an internal interpenetrating network which will reduce or eliminate its thermo-plasticity and impart it improved wash and solvent resistance. In particular, compared to the conventional non-crosslinked products, the hot-melt adhesive in accordance with the invention has both a lower melting point and a higher crystallization rate, which enables it to be used with high performance in widespread applications, such as garment production lines, customized production of various films or adhesive nets, and long-term, high-temperature applications.

SUMMARY OF THE INVENTION

It is an objective of the present invention to provide a method for the preparation of a polyester/glyoxalated polyvinyl alcohol semi-interpenetrating polymer network hot-melt adhesive that is able to overcome the drawback of inability to reconcile the conflicting characteristics of both a low melting point and a high crystallization rate associated with conventional hot-melt adhesives, and hence meets the requirements of related applications.

The method for the preparation of a polyester/glyoxalated polyvinyl alcohol semi-interpenetrating polymer network hot-melt adhesive in accordance with the present invention includes the steps of:

1) adding dimethyl terephthalate, another dibasic ester, 1,4-butanediol, other diols and an organotin catalyst in a reactor to conduct a transesterification reaction in a nitrogen atmosphere at a reaction temperature of 140-180° C. with a vapor temperature maintained at 65-90° C. and terminating the transesterification reaction when an amount of distillation of a monohydric alcohol byproduct reaches greater than 95% of a theoretical amount;

2) after the temperature is maintained for a period of time, adding in a phosphite-based stabilizer and a polycondensation catalyst and increasing the temperature to 160-240° C. to conduct a polycondensation reaction under a reduced pressure for 0.5-1.5 hours to produce particles of a copolymer, and freezing and pulverizing the particles of the copolymer to produce a powder of the copolymer; and 3) uniformly blending a mixture of polyvinyl alcohol/glyoxal with the powder of the copolymer produced in step 2) at ambient temperature to produce the polyester/glyoxalated polyvinyl alcohol semi-interpenetrating polymer network hot-melt adhesive, wherein:

the another dibasic ester is selected from dioctyl phthalate, 1,6-dibutyl adipate, 1,10-dibutyl sebacate, 1,6-dimethyl adipate or dimethyl phthalate;

the molar ratio of dimethyl terephthalate to the another dibasic ester is 1:0.2-0.35;

the other diols are one or more selected from the group consisting of ethylene glycol, 1,6-hexanediol, 2,2,4-trimethyl-1,3-pentanediol, neopentyl glycol and 1,3-propanediol;

the molar ratio of 1,4-butanediol to the other diols is 1:0.1-0.35;

the molar ratio of total ester groups to total hydroxyl groups is 1:1.1-1.8;

the total ester groups refer to ester functional groups in dimethyl terephthalate and the another dibasic ester;

the total hydroxyl groups refer to hydroxyl functional groups in 1,4-butanediol and the other diols;

the mixture of polyvinyl alcohol/glyoxal comprises 13%-37.5% by weight of glyoxal, and the mixture of polyvinyl alcohol/glyoxal accounts for 0.2%-0.5% by weight of the powder of the copolymer produced in step 2).

The organotin catalyst may be butylstanoic acid in an amount accounting for 0.02%-0.04% by weight of dimethyl terephthalate, and the polycondensation catalyst may be tetrabutyl titanate in an amount accounting for 0.02%404% by weight of dimethyl terephthalate.

The phosphite-based stabilizer may be triphenyl phosphite in an amount accounting for 0.01%-0.09% by weight of dimethyl terephthalate.

The novelty of the present invention lies in adding the mixture of PVA/glyoxal in the prepolymerized copolyester, and the resulting hot-melt adhesive product is characterized in that: when is baked at a suitable temperature, the PVA will react with the glyoxal to form an acetal compound and generates a network interpenetrating to a certain extent with the copolyester, and in this way obtaining a polyester/glyoxalated polyvinyl alcohol semi-interpenetrating network hot-melt adhesive. The produced polyester/glyoxalated polyvinyl alcohol semi-interpenetrating polymer network hot-melt adhesive has many advantages, such as a low melting point, fast crystallization, high heat resistance and good tolerance to dry, wet and alkaline conditions. Moreover, the hot-melt adhesive can be easily prepared and is suited for the use in the production of adhesive films and nets and in long-term, high-temperature applications.

DETAILED DESCRIPTION

The invention is explained in greater detail below on the basis of some examples which are illustrative and not limitative of the invention.

EXAMPLE 1

In a four-neck flask, serving as a reactor, provided with a thermometer, a mechanical stirrer and a reflux condenser, 291 g of dimethyl terephthalate, 87.1 g of 1,6-dimethyl adipate, 225 g of 1,4-butanediol, 33.1 g of 1,6-hexanediol, 29.2 g of 2,2,4-trimethyl-1,3-pentanediol and 0.058 g of butylstanoic acid were added, followed by the introduction of nitrogen gas, and were then stirred and heated, with condensation water being circulated simultaneously, to a temperature of about 160° C. at which methanol began to distil off. The reactor was then maintained at the temperature until the transesterification reaction completed with the amount of methanol distillate exceeding 95% of the theoretical amount. The temperature was maintained for a period of 0.5 hour and then the reactor was heated to a temperature of 220° C., at which 0.029 g of triphenyl phosphite and 0.058 g of tetrabutyl titanate were further added in to trigger the polycondensation reaction. Afterward, the polycondensation reaction was continued for 30 minutes concurrently with the reactor being gradually vacuumized to 100 Pa and heated from 220° C. to 235° C. With the completion of this polycondensation reaction, the system was devacuumized in the nitrogen atmosphere to generate particles of a copolymer which are thereafter frozen and pulverized to produce a powder of a copolyester. In this copolyester power, a polyvinyl alcohol/glyoxal mixture, containing 13% by weight of glyoxal and accounting for 0.2% by weight of the powder, was subsequently added in and blended homogeneously therewith at ambient temperature to produce a hot-melt adhesive. The hot-melt adhesive was measured, using GPC (gel permeation chromatography) and DSC (differential scanning calorimetry) devices, to have an average molecular weight of 15,260 g/mol and a melting point of 90-110° C., respectively. In addition, it also had: a melt flow rate (MFR) of 120 g/10 min. at 160° C., measured in accordance with the P.R.C. national standard GB/T3682-2000; an open time of 15 seconds, measured in accordance with the P.R.C. chemical industry standard HG/T 3716-2003; an initial peel strength of 26.08 N, measured in accordance with the P.R.C. textile industry standard FZ/T 01085-2009; a peel strength of 22.1 N after washing, measured in accordance with the P.R.C. textile industry standard FZ/T 01084-2000; a peel strength of 19.82 N after dry cleaning, measured in accordance with the P.R.C. textile industry standard FZ/T 01083-2009; and peel strengths of 15.25 N and 16.69 N after immersion in an acidic solution with a pH value of 2 and an alkaline solution with a pH value of 11, respectively, measured according to the same procedures as specified in FZ/T 01084-2000.

EXAMPLES 2-6

Hot-melt adhesives were produced using similar processes and conditions as described in Example 1, and all process conditions and raw material arrangements and characteristics of the adhesives are summarized in Table 1.

TABLE 1

Process conditions and product characteristics of Examples 2~6 and Comparison Example

| | Examples | | | | | Comparison |
|---|---|---|---|---|---|---|
| | 2 | 3 | 4 | 5 | 6 | Example |
| Dimethyl Terephthalate (mol) | 2 | 2 | 2 | 2 | 2 | 2 |
| Dioctyl Phthalate (mol) | 0.4 | | | | | |
| 1,6-Dibutyl Adipate (mol) | | 0.45 | | | | |
| 1,10-Dibutyl Sebacate (mol) | | | 0.6 | | | 0.6 |
| 1,6-Dimethyl Adipate (mol) | | | | 0.7 | | |
| Dimethyl Phthalate (mol) | | | | | 0.5 | |
| 1,4-Butanediol (mol) | 2.1 | 3.2 | 2.7 | 2.9 | 3.6 | 2.7 |
| Ethylene Glycol (mol) | 0.30 | | 0.24 | 0.45 | | 0.24 |
| 1,6-hexanediol (mol) | | 0.5 | | | 0.5 | |
| 2,2,4-trimethyl-1,3-pentane diol (mol) | | 0.6 | | | | |
| Neopentyl Glycol (mol) | | | 0.3 | 0.45 | | 0.3 |
| 1,3-Propanedio (mol) | 0.24 | | | | 0.4 | |
| Butylstanoic Acid (g) | 0.078 | 0.098 | 0.078 | 0.0155 | 0.078 | 0.078 |
| Triphenyl Phosphite (g) | 0.12 | 0.122 | 0.349 | 0.14 | 0.039 | 0.349 |
| Tetrabutyl Titanate (g) | 0.078 | 0.078 | 0.101 | 0.101 | 0.155 | 0.101 |
| Duration of Temperature maintained after completion of transesterification reaction (min.) | 30 | 40 | 45 | 50 | 60 | 45 |
| Polycondensation Reaction Time (min.) | 40 | 50 | 65 | 60 | 70 | 65 |
| Polycondensation Reaction Temperature (° C.) | 220~240 | 220~240 | 220~240 | 220~240 | 220~240 | 220~240 |
| PVA/Glyoxal (23%)*: Copolyester | | 0.3% | | 0.4% | | / |
| PVA/Glyoxal (31%)*: Copolyester | 0.2% | | 0.25% | | | / |
| PVA/Glyoxal (37.5%)*: Copolyester | | | | | 0.5% | / |

TABLE 1-continued

Process conditions and product characteristics of Examples 2~6 and Comparison Example

|  | Examples | | | | | Comparison Example |
|---|---|---|---|---|---|---|
|  | 2 | 3 | 4 | 5 | 6 | |
| Average Molecular Weight (g/mol) | 16200 | 21080 | 23090 | 25580 | 24890 | 22980 |
| Melting Point (° C.) | 98~112 | 104~116 | 102~109 | 105~115 | 104~122 | 102~109 |
| MFR at 160° C. (g/10 min.) | 95.7 | 88.3 | 84.7 | 83.2 | 81.9 | 84.7 |
| Open Time (s) | 15 | 10 | 15 | 10 | 15 | 20 |
| Initial Peel Strength (N/5 cm) | 21.2 | 21.68 | 23.84 | 23.07 | 24.35 | 23.84 |
| Peel Strength after Washing (N/5 cm) | 19.08 | 19.13 | 21.45 | 20.76 | 20.94 | 14.83 |
| Peel Strength after Dry Cleaning (N/5 cm) | 17.84 | 18.02 | 20.26 | 17.99 | 19.84 | 15.92 |
| Peel Strength after Immersion in Acidic Solution (N/5 cm) | 13.78 | 12.96 | 15.40 | 14.90 | 15.87 | 11.90 |
| Peel Strength after Immersion in Alkaline Solution (N/5 cm) | 13.64 | 13.72 | 15.68 | 14.20 | 15.20 | 10.26 |

*Bracketed percentages denote proportions of glyoxal in polyvinyl alcohol/glyoxal mixtures.

What is claimed is:

1. A method for preparation of a polyester/glyoxalated polyvinyl alcohol semi-interpenetrating polymer network hot-melt adhesive, comprising the steps of:
   1) adding dimethyl terephthalate, another dibasic ester, 1,4-butanediol, other diols and an organotin catalyst in a reactor to conduct a transesterification reaction in a nitrogen atmosphere at a reaction temperature of 140-180° C. with a vapor temperature maintained at 65-90° C. and terminating the transesterification reaction when an amount of distillation of a monohydric alcohol byproduct reaches greater than 95% of a theoretical amount;
   2) after the reaction temperature is maintained for a period of time, adding in a phosphite-based stabilizer and a polycondensation catalyst and increasing the temperature to 160-240° C. to conduct a polycondensation reaction under a reduced pressure for 0.5-1.5 hours to produce particles of a copolymer, and freezing and pulverizing the particles of the copolymer to produce a powder of the copolymer; and
   3) uniformly blending a mixture of polyvinyl alcohol/glyoxal with the powder of the copolymer produced in step 2) at ambient temperature to produce the polyester/glyoxalated polyvinyl alcohol semi-interpenetrating polymer network hot-melt adhesive,
   wherein the another dibasic ester is selected from the group consisting of dioctyl phthalate, 1,6-dibutyl adipate, 1,10-dibutyl sebacate, 1,6-dimethyl adipate and dimethyl phthalate;
   wherein a molar ratio of dimethyl terephthalate to the another dibasic ester is 1:0.2-1:0.35;
   wherein the other diols are one or more selected from the group consisting of ethylene glycol, 1,6-hexanediol, 2,2,4-trimethyl-1,3-pentanediol, neopentyl glycol and 1,3-propanediol;
   wherein a molar ratio of 1,4-butanediol to the other diols is 1:0.1-1:0.35;
   wherein a molar ratio of total ester groups to total hydroxyl groups is 1:1.1-1:1.8,
   where the total ester groups refer to ester functional groups in dimethyl terephthalate and the another dibasic ester, the total hydroxyl groups refer to hydroxyl functional groups in 1,4-butanediol and the other dials;
   wherein the mixture of polyvinyl alcohol/glyoxal, which is uniformly blended with the powder of the copolymer produced in step 2), comprises 13%-37.5% by weight of glyoxal; and
   wherein the mixture of polyvinyl alcohol/glyoxal accounts for 0.2%-0.5% by weight of the powder of the copolymer produced in step 2).

2. The method of claim 1, wherein the organotin catalyst is butylstanoic acid in an amount accounting for 0.02%-0.04% by weight of dimethyl terephthalate; and wherein the polycondensation catalyst is tetrabutyl titanate in an amount accounting for 0.02%-0.04% by weight of dimethyl terephthalate.

3. The method of claim 1, wherein the phosphite-based stabilizer is triphenyl phosphite in an amount accounting for 0.01%-0.09% by weight of dimethyl terephthalate.

* * * * *